Sept. 15, 1953  P. L. LEGUS  2,652,151
FILTER

Filed Sept. 23, 1950  2 Sheets-Sheet 1

Inventor
PAUL L. LEGUS
By Cook & Robinson
Attorney

Sept. 15, 1953 P. L. LEGUS 2,652,151
FILTER
Filed Sept. 23, 1950 2 Sheets-Sheet 2

Inventor
PAUL L. LEGUS
By Cook & Robinson
Attorney

UNITED STATES PATENT OFFICE 2,652,151

FILTER

Paul L. Legus, Tacoma, Wash.

Application September 23, 1950, Serial No. 186,458

1 Claim. (Cl. 210—124)

This invention relates to filters and has reference more particularly to filters for fish aquariums and the like wherein means is provided for removing sediment and impurities from the water.

It is the usual practice to provide some means for maintaining the water in fish aquariums in clean and relatively pure condition, and there are many types of filters or other devices to accomplish this objective. The filter which embodies my invention is designed primarily for use on the smaller, home aquarium tanks with a water capacity up to approximately forty gallons.

It is the principal object of my invention to provide a novel filter to be used in conjunction with fish aquariums and the like, which provides for a unique and improved method of circulating the water through the filtering means.

Another object of my invention is to provide a water filter in which the impurities removed from the circulating and filtered water are caused to be deposited in the bottom of the filtering device.

A further object of my invention is to provide a water filtering means which is simple in construction, easy to clean and relatively inexpensive to build.

Another object of my invention is to provide a filtering means which is capable of handling a substantially greater volume of circulating water through a relatively small filter unit.

Still another object of my invention is to provide means whereby the filtering substance can be easily removed for cleaning or replacement.

Other objects of my invention reside in the details of construction, combination of parts and manner of use, as will hereinafter be fully described.

In accomplishing these and other objects of my invention, I have provided the improved details of construction, the preferred forms of which are illustrated in the accompanying drawings, wherein—

Referring more in detail to the drawings—

Figure 1:
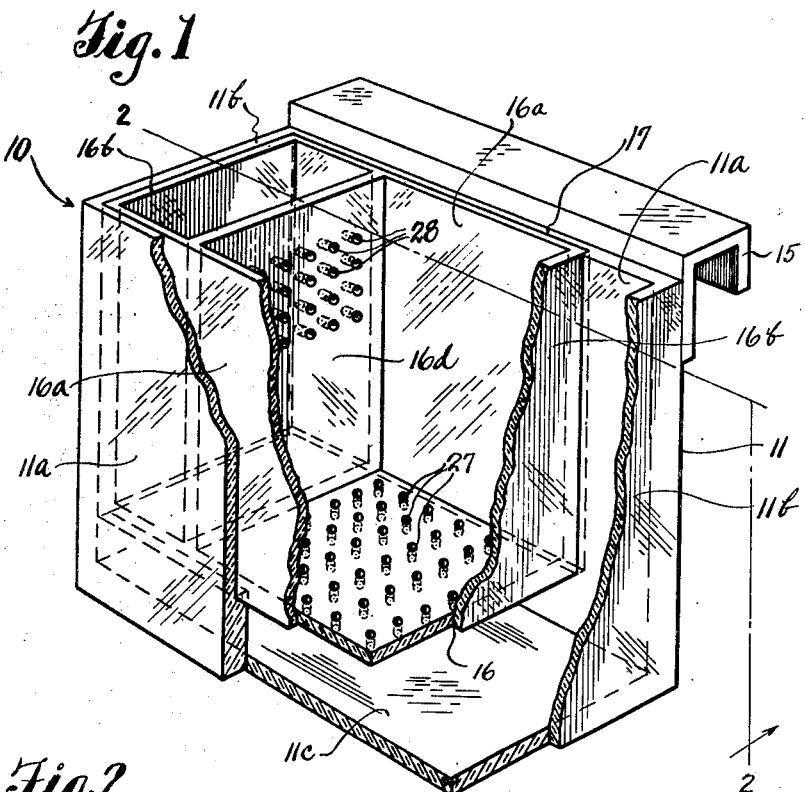
Fig. 1 is a perspective view of the filtering device which embodies my invention, with a portion thereof broken away for better illustration of its construction.

My filter device may vary in size and shape as desired or required to best adapt its use with a particular aquarium. In Fig. 1 I have illustrated a rectangular box-like unit and in Fig. 4, I have illustrated a taller and narrower unit. For purposes of description and explanation, common parts in these two forms of the device, will be identified by the same reference numerals.

Figure 4:
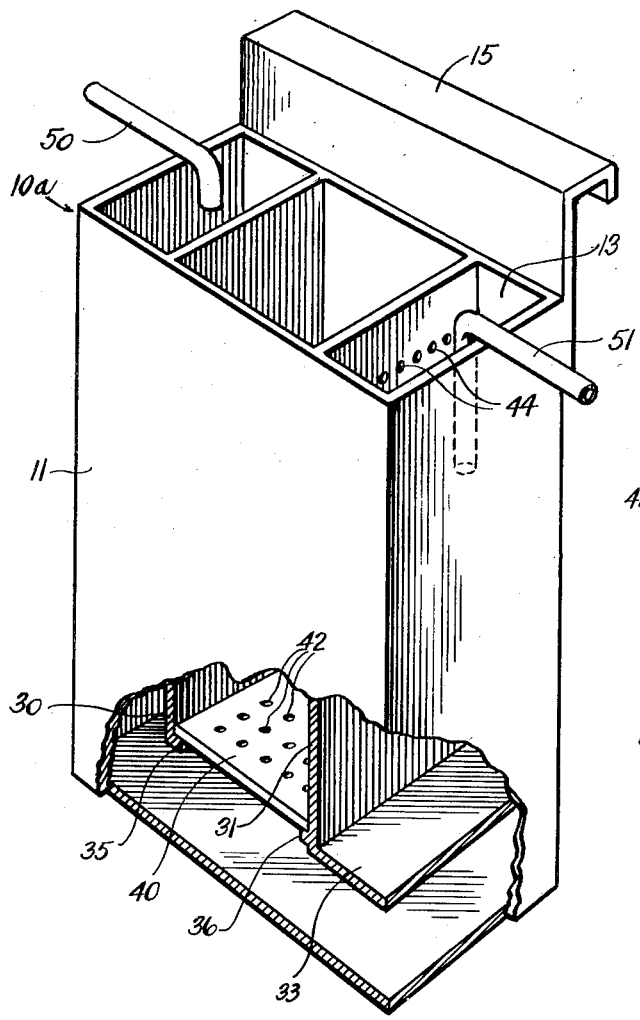
Fig. 4 is a perspective view of my filtering device illustrating an alternative form of construction.

The complete units as shown in Figs. 1 and 4 are designated in their entirety by reference numerals 10 and 10a respectively. Each comprises a rectangular container 11, which is divided into sections or compartments 12, 13 and 14 respectively. Also, each is provided with a securing means or bracket 15 for mounting the filtering unit on the side of the aquarium.

The material from which the units are constructed may vary as desired or required without departing from the teaching of my invention. It is preferred, however, that the container and all parts which comprise the complete unit be made from transparent plastic, such as "Plexiglas," since this material is easy to work, is less expensive than other suitable materials and produces what is believed to be a most attractive finished product.

The filter unit illustrated in Fig. 1 is formed in two parts, namely, a rectangular container 11 and a somewhat smaller insert 16 removably applied thereto. The container comprises opposite side walls 11a—11a, opposite end walls 11b—11b and a bottom 11c all of which are joined together to form a water tight, box-like receptacle. The side walls 11a—11a are formed with a vertically recessed inner surfaces thereby reducing the thickness thereof, as at 17. These recesses terminate above the bottom 11c, thus providing a ledge 18 on which the insert 16 may be disposed.

The length and height of the insert 16 is approximately three-quarters that of the container 11 and the width of the insert is substantially the same as the inside width of the container between the recessed portions of the side walls. The insert comprises opposite side walls 16a—16a, opposite end walls 16b—16b a bottom 16c and a partitioning wall 16d which extends between the side walls and is parallel to the end walls. These several parts are joined to form a box-like receptacle.

Figure 2:
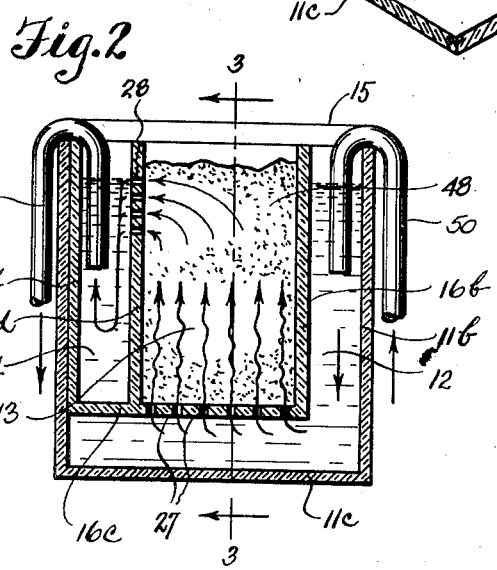
Fig. 2 is a longitudinal cross section taken on the line 2—2 in Fig. 1.
Figure 3:
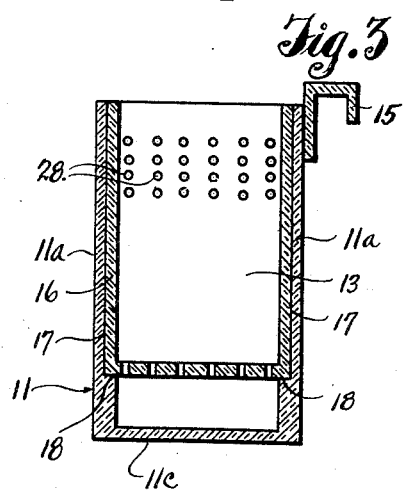
Fig. 3 is a cross section of the device taken on the line 3—3 in Fig. 2.

As is illustrated in Fig. 2, the partitioning wall 16d of the insert 16 is located somewhat near one end wall, thereby dividing the insert into two compartments, 13 and 14. Compartment 13 is approximately twice as large as compartment 14. Formed through the bottom portion of the compartment 13 are a plurality of apertures 27. Similar apertures 28 are provided in the partition wall 16d in the upper half thereof.

The securing bracket 15 may be of any desired or required type. I have illustrated a bracket of substantially an inverted U shape, secured to the exterior surface and along the top edge of one side wall of the container 11 which will permit hanging the unit on the side of the aquarium tank.

Figure 6:
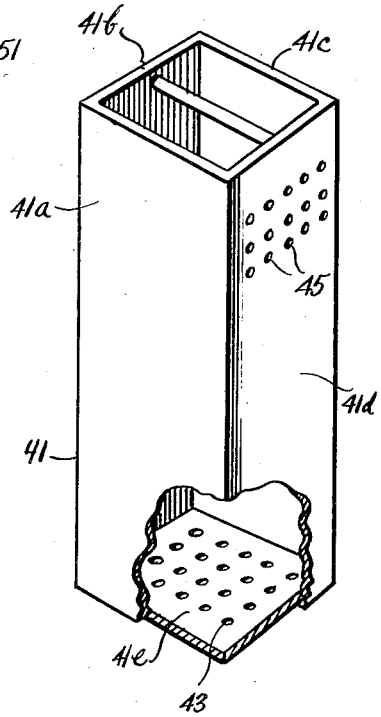
Fig. 6 is a perspective view of the removable container which may be used in the unit shown in Fig. 4.
Figure 5:
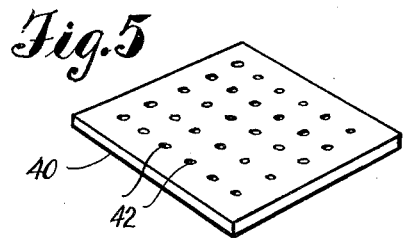
Fig. 5 is an enlarged view of the plate which forms a part of the device illustrated in Fig. 4.

The filter device 10a illustrated in Fig. 4, is somewhat similar in its appearance and mode of use, to the device of Fig. 1, however, there are several structural modifications therein which will now be described: In lieu of the removable insert unit 16, the container has stationary walls 30 and 31 provided and secured therein to the opposite side walls. These walls are vertical and extend downwardly from the top of the container about three quarters of its depth. Between the wall 31 and the adjacent end wall, is a compartment 13 that is closed at its lower end with a bottom wall 33. On the opposing surfaces of the walls 30 and 31, near the bottom thereof are horizontally directed flanges 35 and 36 which are provided to receive and support the plate 40 or removable container 41 of Fig. 6 thereon.

The plate 40 is of such size as to provide a close fit when horizontally disposed on the flanges and is formed with a plurality of holes 42 therethrough, the purpose of which will presently be described. Alternately, the container 41 is adapted to be disposed between the walls 30 and 31 and rest on the flanges 35 and 36. It comprises four vertical walls 41a, 41b, 41c and 41d and an integral bottom plate 41e. The bottom plate is formed with a plurality of holes 43 therethrough and all parts are bonded together.

Formed in the wall 31 near the top thereof are a group of holes 44 which holes are aligned with a similar group of holes 45 in the wall 41d when the container 41 is inserted between the walls 30 and 31.

The various filter units described are used and function in substantially the same manner. A filtering substance 48, such as charcoal, is deposited in the compartment 13 of the device of Fig. 1, or on the plate 40 of the device of Fig. 4, or within the container 41 when it is used in the device of Fig. 4. Hoses 50 and 51 provide the inlet and outlet respectively to the aquarium tank. The water is caused to be circulated by means of a small pump (not shown) having its inlet and outlet connected, respectively to hose 50 and hose 51, providing continuous circulation and filtering or purifying of the circulated water.

It is the common practise in devices heretofore used for this purpose, to have the water flowing from the tank direct to and on top of the filtering medium. In my filter device, the inflowing water is delivered to compartment 12 of the container 11 and from there passes through the holes which separate it from the other compartments. Thus, when the water rises in the container of Fig. 1, it passes up through the holes 27 and seeps upwardly through the charcoal or other water purifying medium. When the water rises to the height of the holes 28, it will flow into the discharge compartment 14 from which it is pumped back to the aquarium tank.

In the device of Fig. 4 the water rising in the container passes upwardly through holes 43 in the plate and seeps up through the filtering medium then through holes 44 to the outer compartment and is pumped back to the aquarium tank. A similar operation takes place when the container 41 is used.

This circulating system has several important or significant advantages. The main advantages being that the dirt or sediment is not delivered direct to the filter thereby clogging the circulation. Rather the water seeps up through the filter medium allowing the sediment to drop to the bottom of the container. This permits the use of a smaller filter with a larger tank and it provides for greater circulation and less often removal and cleaning. Also, an advantage of my device is that the filtered water is contained within a separate compartment, removed from the filtering means and the inflowing, unpurified water.

It is to be understood that the principal of my compartmented filtering unit may be employed in several ways without departing from the teaching and basis of my invention wherein the novelty resides in causing the water to be filtered upwardly through the filtering medium rather than being delivered directly thereonto and filtered in its downward flow.

Having thus described my invention, what I claim as new therein and desire to secure by Letters Patent, is:

A compartmented aquarium filter of the character described comprising a plastic container and a plastic insert unit removably disposed therein; said container forming a water receiving compartment and said insert unit being divided into two parts and forming a water filtering compartment and a discharge compartment; the filtering compartment being adapted to receive a filtering medium therein and a passage through the bottom thereof whereby water rising in the receiving compartment flows upwardly into said filtering compartment and through the filtering medium, said filtering compartment having a passage in the upper portion of the side wall between the discharge compartment through which filtered water will flow into the discharge compartment subsequent to rising through the filtering medium; the side walls of the container being formed with vertically recessed inner surfaces terminating above the bottom of the container and forming a horizontal ledge on which the insert unit is removably disposed.

PAUL L. LEGUS.

References Cited in the file of this patent

UNITED STATES PATENTS

| Number | Name | Date |
| --- | --- | --- |
| 244,262 | Land | July 12, 1881 |
| 1,152,399 | Cronenberger | Sept. 7, 1915 |
| 1,743,524 | Cabrera | Jan. 14, 1930 |
| 1,743,525 | Cabrera | Jan. 14, 1930 |
| 1,776,883 | Cabrera | Sept. 30, 1930 |
| 2,275,428 | Haldeman | Mar. 10, 1942 |
| 2,359,985 | Gordon | Oct. 10, 1944 |
| 2,486,389 | Clark | Nov. 1, 1949 |

FOREIGN PATENTS

| Number | Country | Date |
| --- | --- | --- |
| 20,834 | Great Britain | 1890 |
| 11,200 | Great Britain | 1897 |